United States Patent [19]
Galpin

[11] Patent Number: 4,890,298
[45] Date of Patent: Dec. 26, 1989

[54] TROPOSCATTER MODEM RECEIVER

[75] Inventor: Robert K. P. Galpin, Buckinghamshire, England

[73] Assignee: Plessey Overseas Limited, Ilford, England

[21] Appl. No.: 130,270

[22] Filed: Dec. 8, 1987

[30] Foreign Application Priority Data

Dec. 11, 1986 [GB] United Kingdom ................. 8629636

[51] Int. Cl.$^4$ ............................................. H04B 7/08
[52] U.S. Cl. .................................... 375/14; 375/100; 455/138
[58] Field of Search ...................... 367/45; 455/52, 63, 455/137, 138, 303, 311, 312; 375/12, 14, 100, 101, 102

[56] References Cited
U.S. PATENT DOCUMENTS

| | | | |
|---|---|---|---|
| 3,715,670 | 2/1973 | Hirsch et al. ......................... | 375/14 |
| 3,965,422 | 6/1976 | Tagliaferri .......................... | 455/138 |
| 4,112,370 | 9/1978 | Monsen .............................. | 375/100 |
| 4,271,525 | 6/1981 | Watanabe ............................ | 375/100 |
| 4,281,411 | 7/1981 | Bonn et al. ......................... | 375/100 |

Primary Examiner—Benedict V. Safourek
Attorney, Agent, or Firm—Fleit, Jacobson, Cohn, Price, Holman & Stern

[57] ABSTRACT

The Troposcatter Modem Receiver includes a combiner, demodulator, baseband filter, a complex coefficient forward equalizer, a detector and a feedback circuit. The combiner is a linear maximal-ratio combiner and receives a plurality of input signals at an intermediate frequency and generates a combined output signal for presentation to the demodulator. The demodulator produces a demodulated signal which is filtered by the baseband filter prior to being presented to a first input of the equalizer. The output of the equalizer is forwarded to the detector which produces an output signal. The signal is fed back by way of the feedback circuit to a second input of the equalizer to modify the output signal.

4 Claims, 2 Drawing Sheets

TROPOSCATTER MODEM RECEIVER

FIELD OF THE INVENTION

The present invention relates to a troposcatter modem receiver, for use in digital transmission systems.

The present invention finds application in digitalised transmission over radio channels including tropospheric radio channels.

DESCRIPTION OF PRIOR ART

Such channels suffer from fading due to the nature of the medium and the multipath structure of the channel. To combat these effects, multiple transmission modes are used to improve the availability of the channel, known as multiple diversity transmission. However, if the bandwidth of the signal is wide, frequency selective fading may occur within that bandwidth causing severe distortion to the signal and high error rates, even when the signal to noise ratio is high.

To combat these effects Brady (U.S. Pat. No. 3,633,107 Jan. 1972) proposed a multiple diversity receiver in which each receiver path contained a feed-forward transversal filter, the output of which was combined with that of the other filters, and the tap gains of which were adjusted according to the correlation of an error signal derived from the combined output with the received, delayed signal appearing at the corresponding tap. Monsen (U.S. Pat. No. 3,879,664 April 1975) improved on this concept by adding a non-linear feedback section to Brady's structure. Monsen's concept has been implemented at great expense, and will accomodate only a limited range of dispersion.

In practice, like on tropospheric paths routed across the sea, it is often not possible to choose a short enough distance to suit this limited accomodation of dispersion, and a more powerful equaliser is needed to deal with the more severe distortions likely to be encountered. To extend the capability of the Monsen concept would be prohibitively expensive, and even implementation at baseband instead of at intermediate frequency would also be very expensive.

A schematic of the baseband version of the Monsen concept is shown in FIG. 1. The inputs to the delay lines are complex, that is to say each input comprises an in-phase component and an in-quadrature component, the tap coefficients are complex too, and the coefficient adjustment algorithm is also dealing with complex vectors. The whole system becomes very complicated when more than a few taps are needed.

The inputs to the diversity-equaliser are amplified with a common gain control voltage derived from the strongest signal to make best use of the available signal-to-noise ratio. The diversity-combination is seen to be effected by the equaliser tap-gain control algorithm.

There are two major disadvantages with the systems described above. The first is the excessive complexity of the design and hence the very high cost of implementation and subsequent maintenance. The second is the fact that using an equal-gain philosophy leads to a degradation in performance. For example, given the condition in a quadruple-diversity system where three of the four diversity paths have faded, and only one path has a usable signal-to-noise ratio, say E1/No, the equal gain system will provide an equal level of noise from the other three channels as well; so assuming that the noise is uncorrelated the signal to noise ratio will become E1/4No, a degradation of 6dB. For a troposcatter link, 6dB could represent a difference in transmitter power between 2.5 kW and 10 kW.

STATEMENT OF THE OBJECTS OF INVENTION

Accordingly an aim of the present invention is to provide a troposcatter modem receiver which does not suffer from the above mentioned disadvantages.

SUMMARY OF THE INVENTION

According to the present invention there is provided a troposcatter modem receiver for use in digital transmission systems, the modem receiver includes a combiner means, a demodulator circuit, a baseband filter, a complex-coefficient forward equaliser circuit, a detector circuit and a feedback circuit, said combiner means is a linear maximal-ratio combiner and receives a plurality of input signals at an intermediate frequency and generates a combined output signal and presents the signal to the demodulator circuit which produces a demodulated signal which is filtered by the baseband filter prior to being presented to the first input of the equaliser circuit; the output of the equaliser circuit is forwarded to the detector circuit which produces an output signal, which is fed back by way of the feedback circuit to second input of the equaliser circuit to modify the output signal.

BRIEF DESCRIPTION OF THE DRAWINGS

An embodiment of the present invention will now be described with reference to the accompanying drawings in which.

DESCRIPTION OF THE PREFERRED EMBODIMENT

Figure 2:
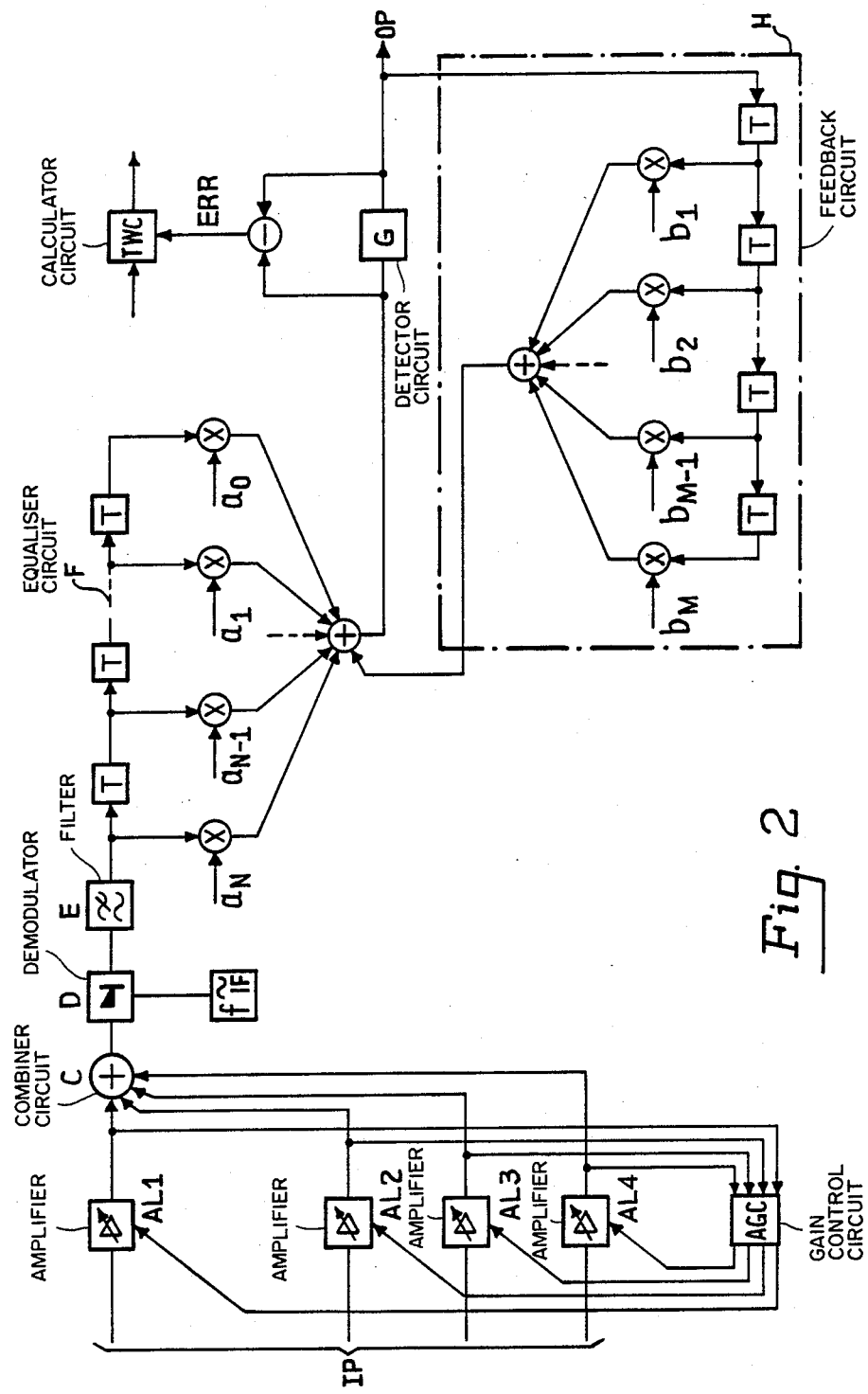
FIG. 2 shows a schematic diagram of a troposcatter modem receiver according to the present invention.

Referring to FIG. 2, the combiner comprises a set of linear amplifiers AL1-AL4 whose gains are dynamically adjusted in proportion to the amplitude of their respective fading signal, normalised to the amplitude of the maximum signal level. The gains are adjusted by the automatic gain control circuit AGC which receives the output signals from the amplifiers and generates a respective adjustment signal to an input of the respective amplifiers AL1-AL4. Each amplifier AL1-AL4 receives a respective input signal IP at the intermediate frequency. The output signals from the amplifiers AL1-AL4 are combined by a combiner circuit C, demodulated by demodulator circuit D operating at the intermediate frequency and filtered by the baseband filter circuit E. The output signal from the filter E is presented to a complex-coefficient forward equaliser circuit F. The output signal from the equaliser circuit F is passed through a detector circuit G which provides the output signal OP for the modem receiver. This output signal is used by a feedback circuit H which modifies the output of the equaliser circuit F. The difference between the detector input and output signals provides an error signal ERR which is used by a calculator circuit TWC for calculating the adaptive tap weight signals.

Figure 1:
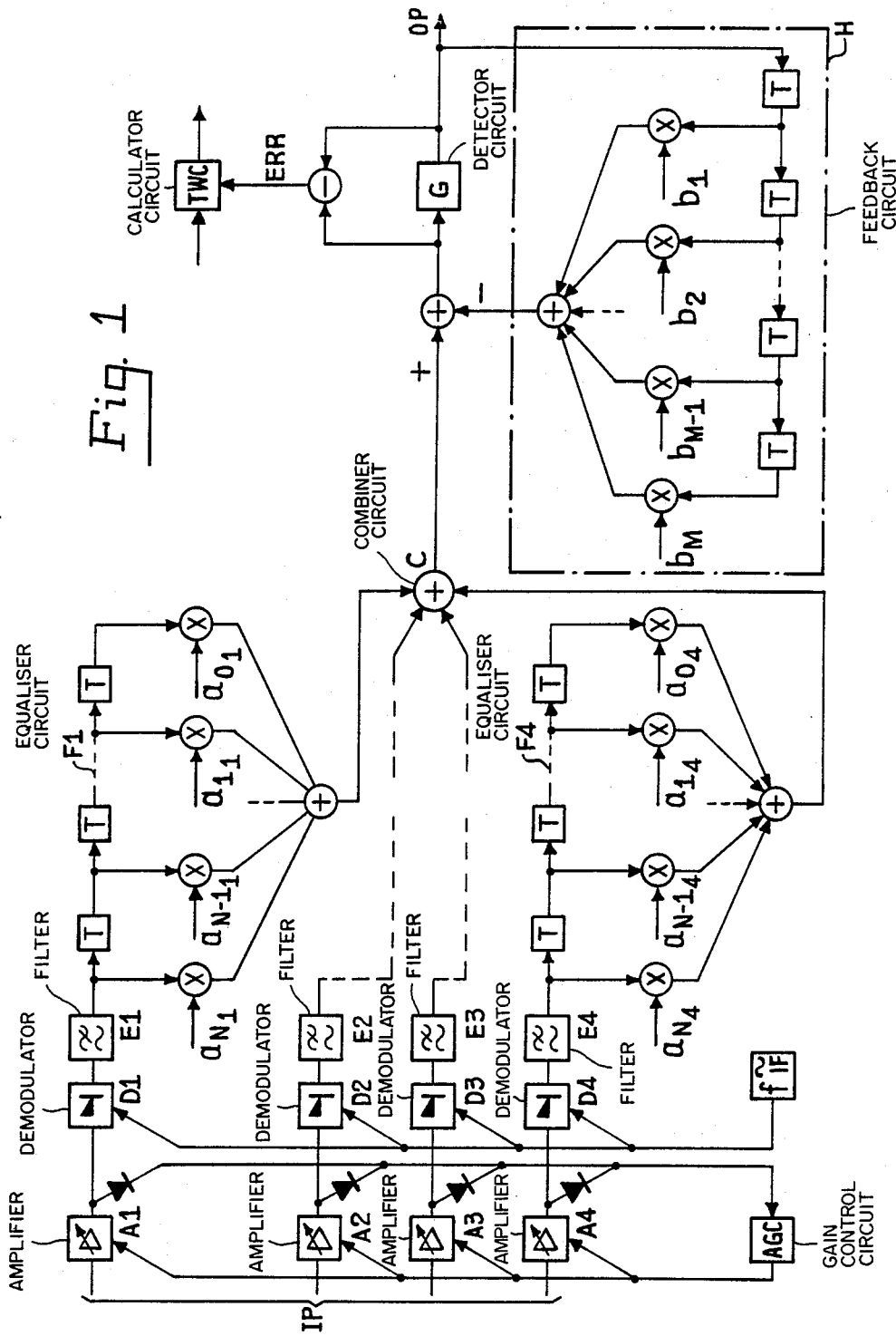
FIG. 1 shows a schematic diagram of a troposcatter modem receiver according to the prior art.

Referring to the schematic diagram of the prior art in FIG. 1, the adaptive algorithm, which correlates the complex error vector ERR of each symbol decision with the complex signal vectors at each tap of each of the four forward equalisers, serves not only to equalise the distortions of the individual channels in association with the common feedback equaliser, but also to combine the four equalised inputs coherently. Referring to FIG. 2, it is clear that in the invention the four input signals are combined incoherently prior to equalisation. The average signal level, given equal input signal levels, would therefore be less than with the coherent signal combination of the prior art in FIG. 1, but with unequal input levels the level-dependant gain control AGC of the invention in FIG. 2 could lead to a reduction in noise from low level channel signals resulting in an enhanced overall signal to noise ratio under most conditions.

It is also clear that the incoherent combination of the input signals according to the invention in FIG. 2 could in principle lead to substantial mutual cancellation of the input signals and hence to severe degradation of the signal to noise ratio. However, since the configuration of the diversity transmission system is designed to minimize the correlation of the fading characteristics of the individual paths, and since the dispersions due to frequency-selective fading of the individual paths will be substantially uncorrelated under normal conditions of troposcatter transmission, any such cancellation could only be momentary and well within the capability of the non-linear feedback equaliser to absorb without error.

In the event of a non-dispersed specular channel characteristic so strong that it is partially correlated over more than one diversity path, as could happen in 15 principle under peculiar atmospheric conditions inducing surface ducting over the sea or diffraction over mountain ranges, and further, in the event of such correlated characteristics leading to partial mutual signal cancellation, the received input signal levels would be so abnormally high that the residual partially-cancelled signal would still provide a good signal-to-noise ratio.

In summary, whereas the prior art employs an adaptive equaliser for each channel of a multiple diversity transmission system, not only to equalise the dispersions inherent in the wideband channels, but also to combine their outputs coherently, the invention exploits the property of those wideband channel dispersions to allow the incoherent summation of the received diversity path signals without fear of substantial mutual cancellation, it enhances the average signal to noise ratio by level-dependent gain control prior to summation, and it exploits the capability of the non-linear feedback equaliser with a single feed-forward section to equalise the frequency selective distortion of the combined signal.

I claim

1. A Troposcatter modem receiver, for use in digital transmission systems, the modem receiver including a combiner means, a demodulator circuit, a baseband filter, a complex-coefficient forward equalizer circuit, a detector circuit and a feedback circuit, said combiner means includes a linear miximal-ratio combiner and receives a plurality of input signals at an intermediate frequency and generates a combined output signal and presents the output signal to the demodulator circuit which produces a denidykated signal to the baseband filter which is filtered prior to being presented to the first input of the equalizer circuit to produce an output, the output of the equalizer circuit being forwarded as an input to the detector circuit which produces an output signal, which is fed back by way of the feedback circuit to a second input of the equalizer circuit to a second input of the equalizer circuit to modify the output signal of the detector circuit.

2. A troposcatter modem receiver as claimed in claim 1, wherein the combiner means comprises a number of linear amplifiers, means for adjusting the gains of said amplifiers in proportion to the amplitude of their respective fading signal, means for normalizing the amplitude to an amplitude of the maximum signal level.

3. A troposcatter modem receiver as claimed in claim 2, wherein said means for adjusting the gains includes an automatic gain control circuit.

4. A troposcatter modem receiver according to claim 1, 2 or 3 including means for determining the difference between the detector circuit input and output by a difference circuit which provides an error signal which is used by a calculator circuit to determine adaptive tap weight signals.

* * * * *